(12) United States Patent
Katz

(10) Patent No.: US 7,616,748 B1
(45) Date of Patent: Nov. 10, 2009

(54) CENTRAL CALL SCREENING SYSTEM

(75) Inventor: Ronald A. Katz, Los Angeles, CA (US)

(73) Assignee: Telebuyer, LLC, Los Angeles, CA (US)

( * ) Notice: Subject to any disclaimer, the term of this patent is extended or adjusted under 35 U.S.C. 154(b) by 0 days.

(21) Appl. No.: 10/322,842

(22) Filed: Dec. 18, 2002

Related U.S. Application Data

(63) Continuation-in-part of application No. 10/287,837, filed on Nov. 5, 2002.

(51) Int. Cl.
H04M 3/42 (2006.01)
H04M 1/66 (2006.01)

(52) U.S. Cl. ................................. 379/210.02; 379/200
(58) Field of Classification Search .................. 379/200, 379/210.02
See application file for complete search history.

(56) References Cited

U.S. PATENT DOCUMENTS

| | | |
|---|---|---|
| 4,277,649 A | 7/1981 | Sheinbein |
| 5,127,049 A | 6/1992 | Sabo |
| 5,329,578 A | 7/1994 | Brennan et al. |
| 5,452,342 A | 9/1995 | Hashimoto ................... 379/100 |
| 5,467,388 A | 11/1995 | Redd et al. ............. 379/210.02 |
| 5,497,414 A | 3/1996 | Bartholomew ......... 379/142.02 |
| 5,602,908 A | 2/1997 | Fan |
| 5,864,613 A | 1/1999 | Flood .......................... 379/188 |
| 5,974,133 A * | 10/1999 | Fleischer et al. ............ 379/230 |
| 6,385,310 B1 | 5/2002 | Holiday ...................... 379/120 |
| 6,418,211 B1 | 7/2002 | Irvin |
| 6,445,783 B1 | 9/2002 | Creswell et al. ........ 379/207.13 |
| 6,628,429 B1 | 9/2003 | Razazian ..................... 358/426 |
| 6,697,461 B1 * | 2/2004 | Middlesworth et al. .. 379/88.24 |
| 6,721,059 B1 | 4/2004 | Sturgeon et al. ........... 358/1.15 |
| 6,760,421 B2 * | 7/2004 | Heilmann et al. ............ 379/189 |

OTHER PUBLICATIONS

Official Site of TeleZapper™: "Frequently Asked Questions" pp. Nov. 15, 2002.

* cited by examiner

Primary Examiner—Rasha S Al Aubaidi
(74) Attorney, Agent, or Firm—Berry & Associates P.C.

(57) ABSTRACT

A screening service for individual telephone lines to block unwanted calls based on call character signals and caller identification signals function in conjunction with a public switched telephone network. Calls identified by call character signals, as which identify a facsimile machine, and caller identification signals, as which identify an undesired call source, are recognized selectively in accordance with each program for individual telephone lines to provide blocking service including a termination cue. Using a dial-up connection, a subscriber can modify blocking information by a control program.

8 Claims, 3 Drawing Sheets

CENTRAL CALL SCREENING SYSTEM

CROSS REFERENCE TO RELATED PATENTS

This application is a continuation-in-part of U.S. Ser. No. 10/287,837, filed Nov. 5, 2002 by Ronald A. Katz and entitled Comprehensive Telephone Call Screening System.

FIELD OF THE INVENTION

The present invention relates to call screening at a central operation (single location or distributed) to service individual telephone lines and particularly to selectively block unwanted calls.

BACKGROUND OF THE INVENTION

In recent years, the applications and uses for telephone services have greatly increased. Telephone services enable a multitude of different communications, many of which are foreign to traditional voice communication. For example, telephone operations now serve such apparatus as facsimile machines, computers, video control structures and so on. Recognizing the extent of such telephone activity, it is understandable that the number of erroneously placed calls ("wrong numbers") has greatly increased. In fact, it has become common place for individual lines serving personal telephone instruments to receive large numbers of such erroneously placed calls.

Some unwanted telephone calls simply are accidental, for example, calls in which the called number has been erroneously entered, either manually or automatically. However, other unwanted calls are deliberate as in the case of mass-dialing promotions. In that regard, it is noteworthy that expanded telephone operations have enabled telephone promotions and campaigns of vast proportions which solicit variously from individuals. Such campaigns frequently involve solicitations that are undesired and annoying. Thus, power calling is another class of unwanted telephone calls has steadily increased.

Generally, as the number of unwanted telephone calls has increased, various solutions have been proposed. For example, some people have adopted the practice of using a telephone answering machine to screen calls. Also, caller identification units are in widespread use for manual call screening. However, in spite of various proposals, the problem continues to exist, perhaps even intensifying. Consequently, a need exists for developments to mitigate the problem of unwanted telephone calls.

Somewhat recently, in the above-referenced co-pending application, a telephone call screening invention was disclosed, which operates on the basis of recognizing various indicated criteria to identify and block unwanted telephone calls. The application is incorporated by reference herein.

SUMMARY OF THE INVENTION

In part, at a system level, the present invention is based on recognizing various indicating criteria (call data) available from a public switched telephone network (PSTN) to identify and screen or block unwanted telephone calls. For example, screening operations may be executed by a service bureau, by a local exchange carrier or in a network environment. With regard to enhanced network operation based in a network environment, individualized services may be variously executed, for example see U.S. Pat. No. 6,411,684, issued Jun. 25, 2002 to Cohn et al., and entitled Network-Based Multimedia Communications and Directory System and Method of Operation.

It will be appreciated that in the course of telephone operations, a number of call data signals are provided, as from a PSTN, that are available as a result of a placed telephone call. For example, various caller identification signals, e.g. Automatic Number Identification (ANI) services provided in public switched telephone networks are available to indicate the calling telephone number. Other forms of call data signals are provided which reveal the character of a call. For example, facsimile machines (FAX devices) may result in an intermittent tone (1100 Hz) sometimes referred to as an "audio fax tone" or "calling tone" (CNG). Specifically, the calling tone may be of a one-half (½) second duration, repeated after a pause of some 3 seconds for an interval of some 45 seconds. Thus the CNG character signal identifies the calling device as a FAX machine. Of course, the intended purpose of the CNG tone is to establish a handshake with another FAX machine.

Other forms of call character signals (variously indicated) also may be employed to designate or characterize calls, for example, character signals or indications may be provided variously (intentionally or otherwise) to indicate mass-calling promotions, computerized calls or other calls susceptible to characterization.

As disclosed herein, the present invention involves collectively serving a multitude of individual telephone lines from one or more central locations to selectively screen unwanted calls for select subscribers. Essentially, the telephone lines served are identified and associated with programmed or stored call character signals, e.g. audio fax tones (CNG), for selectively blocking unwanted calls. Additionally, as disclosed herein, caller identification signals also may be employed for selective call screening.

Upon identifying individual lines to be screened, specific call characteristic signals and caller identification signals may be variously detected for screening. Selected call data signals are then tested against stored data signals to execute individual screening programs. Accordingly, an effective and dynamic central system for call screening is provided to service individual telephone lines, for example, lines for personal telephone instruments.

BRIEF DESCRIPTION OF THE DRAWINGS

In the drawings, which constitute a part of the specification, an exemplary embodiment is set forth exhibiting various objectives and features hereof, specifically.

DESCRIPTION OF THE ILLUSTRATIVE EMBODIMENT

As required, a detailed illustrative embodiment of the present invention is disclosed herein. However, signal forms, storage, data formats, operating structures, central system locations and so on embodying the present invention may involve a wide variety of different forms, some of which may be quite different from those of the disclosed embodiment. Consequently, the specific structures and functional details disclosed herein are intended to be merely representative; yet in that regard, they are deemed to afford the best embodiment for purposes of disclosure and to provide the basis for the claims herein which define the scope of the present invention.

Figure 1:
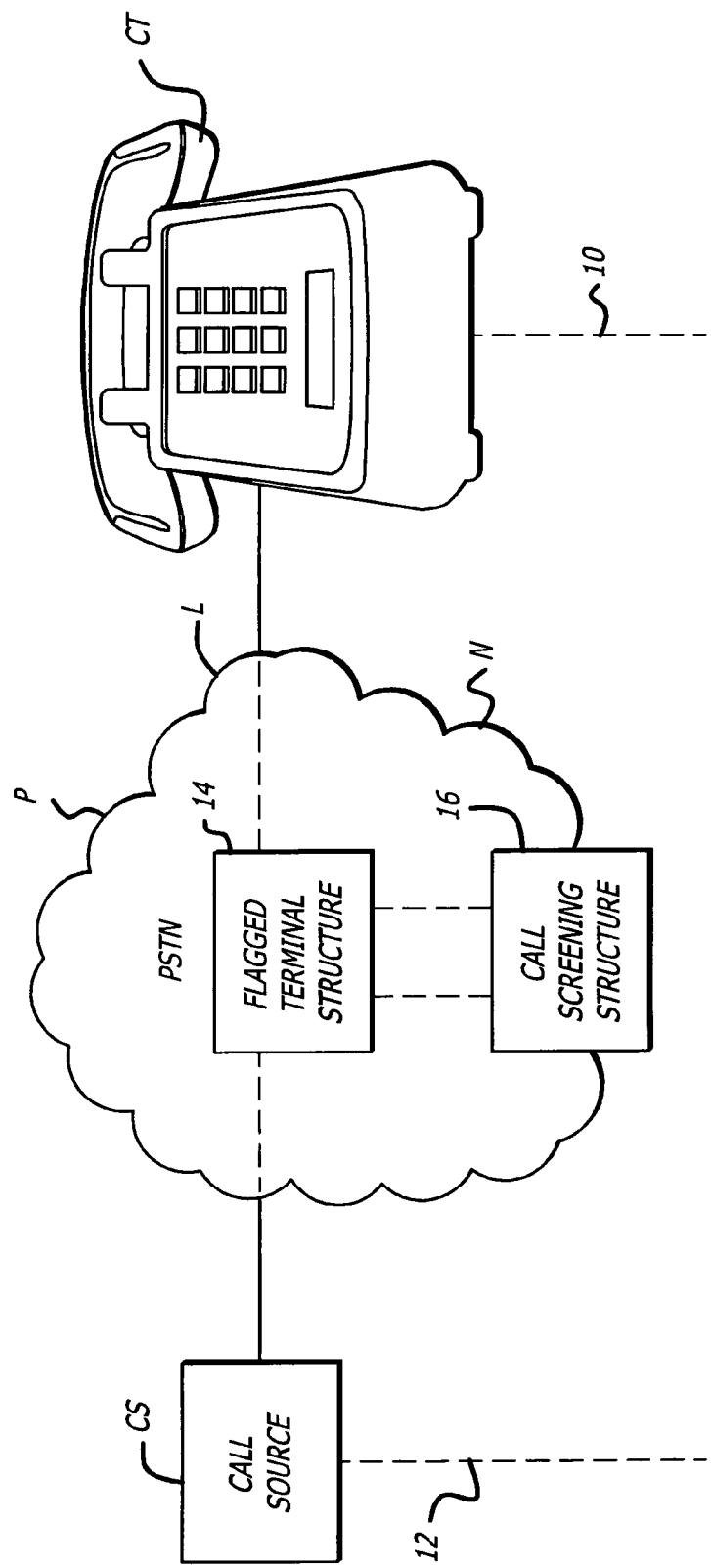
FIG. 1 is a block and perspective view illustrating the system of the present invention.

Referring initially to FIG. 1, a conventional telephone instrument CT is depicted representative of a multitude of instruments that may be serviced by a call screening system. Essentially the instrument CT, along with the referenced multitude of other instruments, indicated by a dash-line 10, is connected to a public switched telephone network (PSTN) designated P. Also connected to the network P is a call source CS, representative of a multitude of source terminals from which calls may be placed. Specifically, as illustrated, a dash-line 12 indicates a multitude of call sources which may take a wide variety of forms including telephone instruments, facsimile machines, computer devices, and so on.

As represented in FIG. 1, the telephone instrument CT may receive, as well as place, calls through the network N to any of a multitude of terminals, exemplified by the call source CS. However, for illustration of the present invention, the call source CS represents an exemplary source of calls to the exemplary telephone instrument CT which is designated as a subscriber for screening service provided as disclosed below.

Generally, calls from the exemplary screen source CS to the telephone instrument CT are provided through the line L and are screened based on call characteristic signals and caller identification signals. As illustrated, the screening system involves a flagged terminal structure 14 and a call screening structure 16. The structure 14 and the structure 16 are illustrated in the proximity of the network N to indicate the availability of call data. In that regard, systems in accordance herewith may be implemented in a network environment (distributed or centrally) to provide screening services; however, similarly, systems also may be implemented by an independent service bureau, or in various configurations with local exchanges. In any event, as illustrated in FIG. 1, the flagged terminal structure 14 identifies specific subscriber telephone instruments from the multitude indicated by the dashed line 10 which are to be provided with call screening service.

As described herein, the instrument CT is associated with a line L which is identified as a line to be serviced on behalf of a subscriber. That is, the line L is identified by the structure 14 as a line which is to be provided screening service, e.g. as part of enhanced network based operations. With such identification, the call screening structure 16 is activated to detect a placed call to the line L and accomplish the service operation. To illustrate the configuration, the exemplary call source CS is shown connected to the structure 14 through a dashed line, with further dashed lines indicating connections through the call screening structure 16 and back through the structure 14 to the line L. Note that as indicated above, screening service in accordance herewith may be provided independently of a network, e.g. by a service bureau. In such an event, it is merely necessary that call data be available apart from the network. Thus, some form of connection or coupling is needed, i.e. in conjunction with a network.

As indicated above, calls to the line L (serving the instrument CT) are screened on the basis of related call data, including call character signals and caller identification signals. Specifically, call character signals designate the character of the call source or the nature of the call, as in the case of a facsimile machine calling tone (CNG). Recognizing that call characteristic signals currently exist, it is to be understood that various forms of such signals may be adopted in the future, for example with the objective of facilitating extended screening in accordance herewith. Note that caller identification signals may take the form of so-called ANI or MIN signals which identify the calling number of the calling source, e.g. call source CS from which the call is placed.

Generally, in accordance herewith, the subscriber served by the line L would arrange an initial stored program of screening service based on call character signals. For example, calls identified by the call character signals CNG would normally be blocked to the instrument CT, used strictly for voice communication.

Additionally, the subscriber of telephone line L may identify specific caller identification signals that identify unwanted calls. For example, if a person using the instrument CT is harassed by calls from an identified telephone terminal, calls from that terminal may be designated for blocking based on caller identification signals.

Recapitulating to some extent, calls to the subscriber instrument CT are flagged and shunted by the flagged terminal structure 14 to the call screening structure 16 for screening. Essentially, during a brief instant, the call screening structure 16 makes a determination with respect to all placed calls to the line L, as a result of which calls are either completed or processed for blocking. Calls that are to be processed are referred to the call screening structure 16.

Called terminals, as the telephone instrument CT, which are flagged for screening service, are identified by the structure 14. On the occurrence of a call to such a terminal, call data signals related to a placed call are provided to the call screening structure 16. As an initial action, the screening program for the line L is fetched to control the screening. Specifically, a called terminal program system 18 (FIG. 2) is actuated.

To consider a specific example, the system 18 might receive data signals, including signals identifying the called line, e.g. (760) 555 8147, ANI signals indicating the call source CS (FIG. 1), e.g. (760) 555 4194 and a CNG signal indicating the call source CS is a FAX machine. The data carried by those signals provides criteria for a program to implement screening service for the line L and the instrument CT. Specifically, the called terminal number, i.e. (760) 555 8147 is detected to address a terminal screening memory 20 and fetch screening program data for the instrument CT. For example, the screening data fetched from the memory 20 may indicate that calls identified by call character signals CNG are to be blocked, and additionally that calls originating from the source CS, i.e. (760) 555 4194 are to be blocked. Reference data, also fetched from the memory 20, may be used for testing with respect to provided call data to determine the fate of an incoming call. For example, a received CNG call character signal correlated to coincide with a reference CNG call character signal mandates call blocking.

Call characteristic signals are tested by characteristic recognition units TU1-TUn which are coupled to the call program system 18. Essentially, each of the characteristic recognition units TU1-TUn is provided to test for the presence of a particular call characteristic signal related to a placed call. Specifically, for example, the characteristic unit TU1 tests for the presence of a received CNG signal by comparing referenced and received signals. A coincidence at any of the recognition units TU1-TUn indicates the call is to be blocked and representative signals in that regard are supplied to a screening circuit 22.

Another test of the disclosed embodiment involves caller identification signals and is accomplished by a blocked calling number unit 24. Essentially, the unit 24 receives reference caller identification signals for comparison with received caller identification signals and provides signal represented results to the screening circuit 22. For example, ANI or MIN signals may be used for the caller identification.

Based on resultant signals indicative of test results, the screening circuit 22 provides a binary output indicative of acceptance or rejection of the incoming call. In the event of acceptance ("yes") an incoming call bridge 26 couples the call through the line L to the instrument CT (FIG. 1). Conversely, the call is blocked.

Blocked calls may result in the provision of cues to the call source CS. Of course in some instances there may not be a person active at a call source; however, in other instances cueing may be desirable. Accordingly, a message unit 28 cues the call source that the call is being rejected. Specifically, the unit 28 may provide a vocal message, e.g. "your call may not be completed". Alternatively, or in addition to such a vocal message, the unit 28 also may provide a synthesized dial tone as an indication that the calling connection has been terminated.

In view of the above description of the call screening system, reference will now be made to FIG. 3 for an explanation of the exemplary screening process with reference also to the FIGS. 1 and 2. Assume that a call is placed from the call source CS (FIG. 1) to the line L serving the telephone instrument CT. With the placement of the call, the flagged terminal structure 14 identifies the dialed number for the line L (760-555 8147) which designates a subscriber for screening service. The step is illustrated in FIG. 3 by the block 30 and activates the call screening structure 16.

With activation of the call screening structure 16, it receives data attendant the placed call. Specifically, the called data passes to the called terminal program system 18 (FIG. 2) and includes all call characteristic signals as illustrated by the block 32 (FIG. 3). For example, assume that the call characteristic signal is a CNG signal which indicates a call from a facsimile machine.

The next step in the process involves testing received characteristic signals for screening in accordance with the specific program for the line L. As assumed, the call characteristic signal CNG (indicating a call from a facsimile machine) is received and is provided to the characteristic recognition unit TU1 (FIG. 2). A variety of techniques may be employed to identify or recognize such an indication as a screening or blocking instruction. For example, a correlation may be performed between a reference call characteristic signal (provided for example from the memory 20) and the received call characteristic signal. Alternatively, any of a variety of signal recognition structures and techniques may be employed to recognize or identify received call characteristic signals. The test step is illustrated in FIG. 3 by a block 34. A query block 36 indicates the consequences of the test step.

If the recognition test is affirmative ("yes") the process proceeds from the block 36 to a block 38 for the purpose of terminating the call. Essentially, with the positive recognition of the call characteristic signal CNG as a blocking instruction, the recognition unit TU (FIG. 2) provides a command signal to the screening unit 22. With the occurrence of such an instruction signal, the screening unit 22 actuates the unit 28 to provide termination cues. Specifically, the unit 28 provides an audio message as indicated by the block 39 (FIG. 3) for example: "your call may not be completed".

In addition to an audio termination message, as disclosed herein, a synthesized dial tone also is transmitted to the call source CS (FIG. 1). Specifically, the unit 28 (FIG. 2) provides a synthesized dial tone to the line L which is returned to the call source CS indicating, at least to a person, to go on hook. Of course a variety of termination signals, cues or messages may be provided with the objective of terminating a call. The step of transmitting a dial tone is illustrated in FIG. 3 by a block 40.

Returning to the query block 36, if in relation to the exemplary call, the call characteristic signal CNG is not detected ("no") the process proceeds as indicated by a dashed line 42 representing repeated tests for call characteristic signals. That is, the dashed line 43 indicates that the steps of blocks 32, 34 and 36 may be repeated for each call character signal of the recognition units TU1-TUn (FIG. 2) which are programmed for the line L. Accordingly, if any call characteristic signal is detected which identifies a call to be blocked for the line L, the screening circuit 22 receives a blocking signal and the call is blocked as indicated by the steps 38 and 40 of FIG. 3. Thus, unwanted calls identified by call character signals are denied access to the instrument CT.

If no call character signals are received which would identify an unwanted call, the process proceeds to the step of block 44 in FIG. 3. Specifically, the calling terminal number is received, as by some form of ANI signal or MIN signal. The received number signal is tested by the calling number unit 24, as in relation to reference terminal numbers stored in the memory 20. In one embodiment, a list of terminal numbers from which calls are to be blocked is scanned for identity with a received terminal number. The operation, executed by the unit 24 (FIG. 2) is illustrated in FIG. 3 by the block 46. The results of the test operation are illustrated in FIG. 3 by a query block 48. In that regard, a coincidence ("yes") result advances the process to a query block 38 with the alternative steps for processing the call. The occurrence of a coincidence ("yes") terminates the call as explained above with the steps of blocks 38 and 40. Alternatively, the lack of a coincidence ("no") actuates the incoming call bridge 26 (FIG. 2) to connect the call as illustrated by the block 50 (FIG. 3). Thus, incoming calls are tested based on call character signals and caller identification signals to selectively screen calls and block unwanted calls. Note that upon the identification of an unwanted call, the process is terminated by the screening unit 22 (FIG. 2) essentially blocking the call. Note that although the called-terminal program system 18, as described above, performed the tests in an order of call character signals followed by caller identification signals such order is not deemed necessary. That is, depending on design considerations and the types of test structures employed, expedient choices of order can be selected.

As indicated above, the customized preliminary data for a specific telephone instrument, e.g. instrument CT (FIG. 1) may be stored in the terminal-screening memory 20 (FIG. 2) at the time of subscription. In that regard, individual call character signals and call identification signals may be stored identifying unwanted calls and caller terminals. Subsequently, the subscriber may use the instrument CT to alter the contents of the memory 20.

Figure 2:
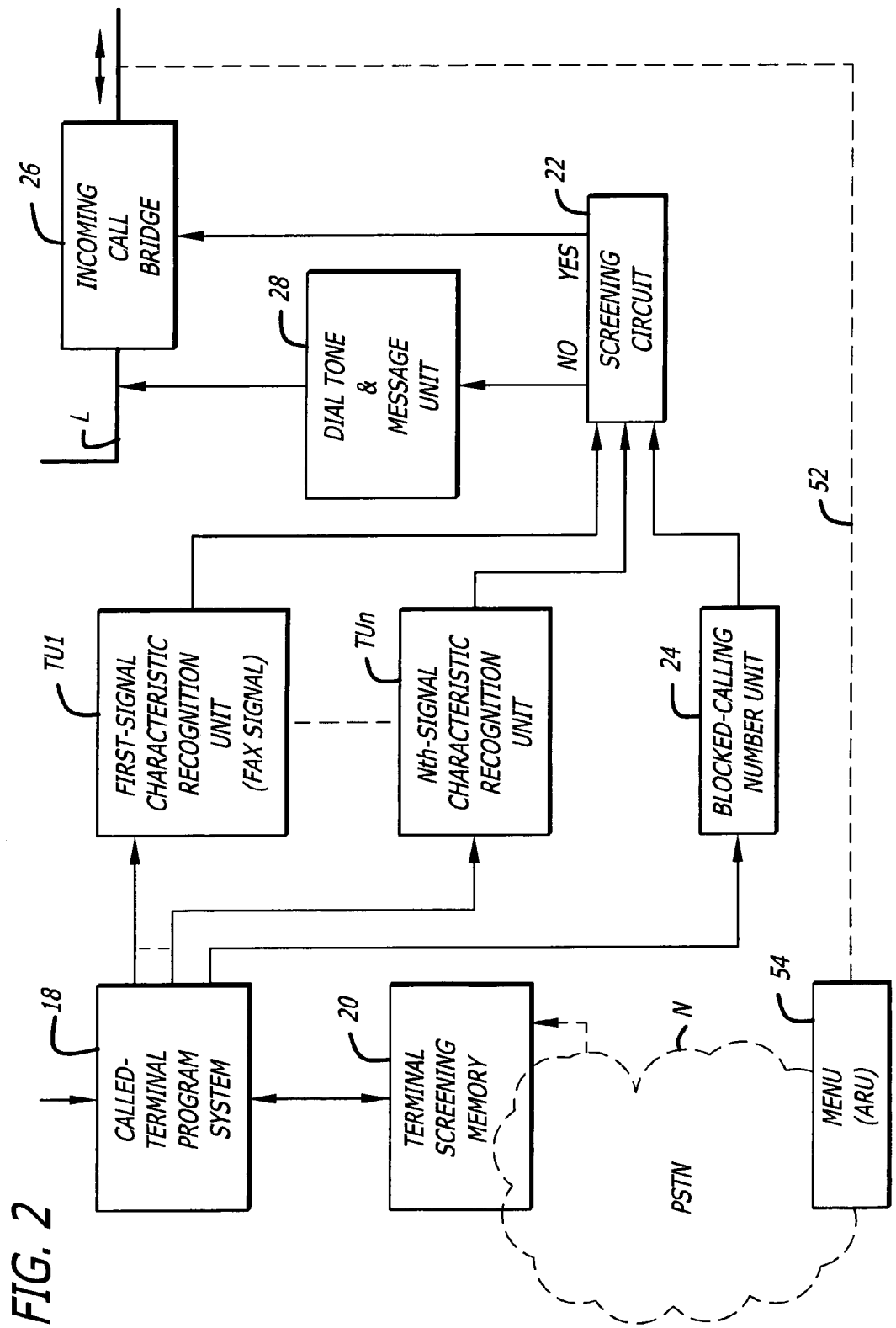
FIG. 2 is a block diagram of a call screening system as depicted in FIG. 1.
Figure 3:
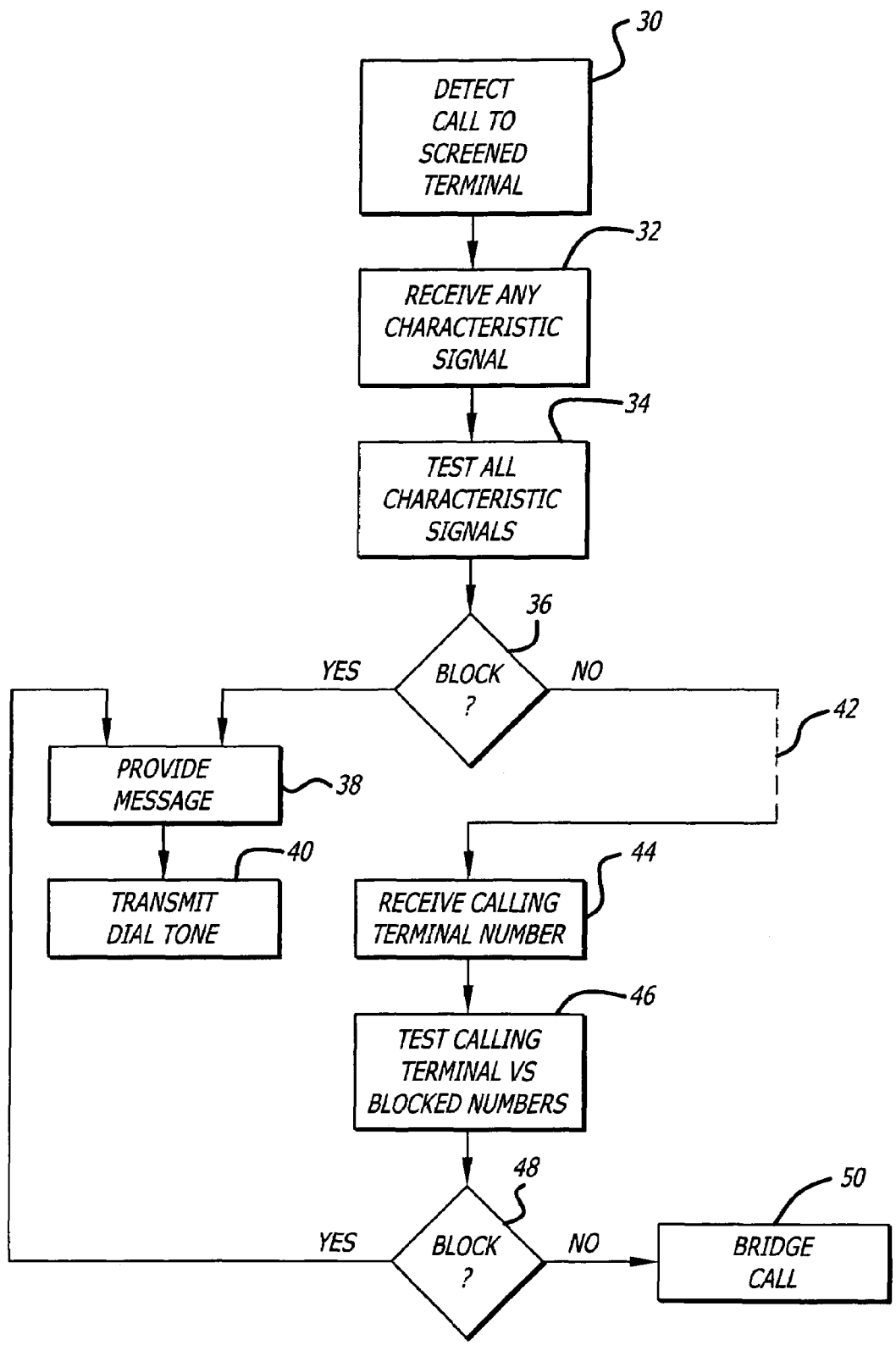
FIG. 3 is a flow chart detailing the operation of the system as represented in FIGS. 1 and 2.

Referring to FIG. 2, a dashed line 52 extends from the line L to a menu unit 54 which essentially performs the functions of an audio response unit (ARU) to access the memory 20. Specifically, to alter a screening program, the subscriber at the instrument CT goes off hook and dials up the menu unit 54 to establish a connection as illustrated by the dashed line 52. The menu unit 54 is associated with or coupled to the network N affording access to the memory 20. Upon the establishment of a connection, the subscriber is provided a menu for modifying that portion of the memory 20 stored for programmed screening of the line L. For example, assume the subscriber wishes to add a telephone terminal number, from which calls are to be blocked. With the establishment of a connection the menu unit 54 interfaces the subscriber to produce dial-up signals, e.g. DTMF signals, representations of which are then stored in the memory 20. Consequently, future calls identified by such a calling number will be blocked. Of course, a wide variety of interface operations may be executed utilizing techniques well known in the communication arts.

It will be apparent that various techniques may be employed in systems utilizing the concepts as disclosed herein. A variety of correlation or signal recognition techniques may be employed, components of the system may be variously distributed and the service may be variously provided by different services. Also, the techniques may be used in relation to different types of instruments, telephone equipment, call characteristic signals, data storage and programming. Accordingly, the proper scope hereof is deemed to be appropriately determined on the basis of the claims as set forth below.

What is claimed is:

1. A central call screening system in use in conjunction with a public switched telephone network, which network provides call data signals including call data character signals generated by a call source apparatus including a facsimile capability and indicative of call character, the central call screening system for selectively blocking placed calls to specific telephone lines on the basis of detecting the call data character signals received, comprising:
   a monitoring unit for detecting calls placed to a specific telephone line and receiving call data signals relating to a placed call including call data character signals generated by the facsimile capability of the call source apparatus designating the character of a call;
   signal recognition structure for directly recognizing certain facsimile call data character signals provided from the call source apparatus and received by the monitoring unit to identify unwanted calls placed to the specific telephone line from the call source apparatus; and
   a call blocking unit controlled by the signal recognition structure to block unwanted facsimile calls for users of telephones placed by the facsimile capability of the call source apparatus to the specific telephone line.

2. A call screening system according to claim 1 further including a voice generator to vocalize a rejection message to blocked calls.

3. A call screening system according to claim 1 wherein the signal recognition structure recognizes facsimile signals indicating a call of a character to transmit signals representative of scanned images.

4. A call screening system according to claim 1 wherein the monitoring unit includes a storage structure for storing reference signals.

5. A call screening system according to claim 1 wherein the monitoring unit further detects caller identification signals; wherein the signal recognition structure recognizes certain caller identification signals provided by the monitoring unit to identify unwanted placed calls to the specific telephone line.

6. A method of screening calls for operation in conjunction with a public switched telephone network, which network provides call data signals, including call data character signals generated by a facsimile capability of a call source apparatus and indicative of call character; the method selectively blocking placed calls to specific individual telephone lines based on call character, and comprising the steps of:
   detecting facsimile calls placed to a specific telephone line and receiving call data signals relating to a placed call including call data character signals generated by the facsimile capability of the call source apparatus;
   directly recognizing certain call data character signals generated by the facsimile capability of the call source apparatus designating the nature of a call, as recognized to identify unwanted facsimile calls placed to the specific telephone line; and
   based on the certain facsimile call data character signals as recognized, blocking all unwanted facsimile placed calls for users of telephones to the specific telephone line.

7. A method according to claim 6 further including a step of vocalizing a blocked call message to placed calls.

8. A method according to claim 6 wherein the included call data character signals comprise a FAX tone signal.

* * * * *

Disclaimer

7,616,748 B1 — Ronald A. Katz, Los Angeles, CA (US). CENTRAL CALL SCREENING SYSTEM. Patent dated November 10, 2009. Disclaimer filed January 28, 2016, by the assignee, Telebuyer, LLC.

Hereby disclaim complete claims 1-8 of said patent.

*(Official Gazette, April 5, 2016)*